(12) United States Patent
Campau et al.

(10) Patent No.: US 10,588,276 B2
(45) Date of Patent: Mar. 17, 2020

(54) HYDROPONIC NUTRIENT AERATION AND FLOW CONTROL DEVICE AND SYSTEM

(71) Applicant: Flow-Rite Controls, Ltd., Byron Center, MI (US)

(72) Inventors: Daniel N. Campau, Ada, MI (US); Mark W. Herrema, Rockford, MI (US)

(73) Assignee: FLOW-RITE CONTROLS, LTD., Byron Center, MI (US)

( * ) Notice: Subject to any disclaimer, the term of this patent is extended or adjusted under 35 U.S.C. 154(b) by 3 days.

(21) Appl. No.: 16/057,116

(22) Filed: Aug. 7, 2018

(65) Prior Publication Data
US 2020/0045899 A1   Feb. 13, 2020

(51) Int. Cl.
*A01G 31/02* (2006.01)
*A01G 31/00* (2018.01)

(52) U.S. Cl.
CPC ........ *A01G 31/02* (2013.01); *A01G 2031/006* (2013.01)

(58) Field of Classification Search
CPC ...... A01G 31/02; A01G 31/006; A01G 25/16; A01G 2031/006; B01F 3/04099; B01F 5/0428
USPC ............................................ 261/76, DIG. 75
See application file for complete search history.

(56) References Cited

U.S. PATENT DOCUMENTS

| | | | | |
|---|---|---|---|---|
| 1,413,107 A | * | 4/1922 | Duncan | F02B 25/00 261/62 |
| 1,901,806 A | * | 3/1933 | Fulton | B05B 7/04 239/432 |
| 2,852,239 A | * | 9/1958 | Vicard | B01D 47/10 261/24 |
| 3,334,657 A | * | 8/1967 | Smith | B01F 5/0256 137/888 |
| 3,643,376 A | * | 2/1972 | Poindexter | A01G 31/02 47/61 |
| 3,853,271 A | * | 12/1974 | Freshour | B01F 5/0415 239/8 |
| 3,925,926 A | * | 12/1975 | Shigeo | A01G 31/02 47/62 C |
| 4,484,601 A | | 11/1984 | Campau | |

(Continued)

FOREIGN PATENT DOCUMENTS

| EP | 0471321 A1 | * | 2/1992 | ............ B01F 5/0416 |
|---|---|---|---|---|
| WO | 02085103 | | 10/2002 | |

OTHER PUBLICATIONS

International Search Report and Written Opinion from PCT/US2019/032138 dated Jul. 19, 2019.

*Primary Examiner* — Magdalena Topolski
(74) *Attorney, Agent, or Firm* — Warner Norcross + Judd LLP

(57) ABSTRACT

The specification discloses a hydroponic nutrient aeration and flow control (NAFC) device and system, which both aerates and controls the flow of the hydroponic nutrient solution. The NAFC device has no moving parts. Each NAFC device mixes and aerates the nutrient from the nutrient reservoir with air and/or nutrient from one of the grow tanks. Each NAFC device additionally controls the flow of the aerated nutrient solution to the grow tank and the nutrient reservoir. The vertical position of the end of the nutrient return line in each grow tank may be adjusted to adjust the level of the nutrient solution within the grow tank.

4 Claims, 10 Drawing Sheets

(56) References Cited

U.S. PATENT DOCUMENTS

| | | | |
|---|---|---|---|
| 4,527,593 A | 7/1985 | Campau | |
| 4,689,237 A * | 8/1987 | Fabre | A23L 3/22 |
| | | | 261/76 |
| 4,690,764 A * | 9/1987 | Okumura | B01F 3/0451 |
| | | | 210/220 |
| 4,865,776 A | 9/1989 | Campau | |
| 5,136,804 A * | 8/1992 | Rothem | A01G 31/02 |
| | | | 47/59 R |
| 5,876,639 A | 3/1999 | Campau | |
| 8,302,884 B1 * | 11/2012 | Barrera | B01F 5/0428 |
| | | | 239/318 |
| 8,746,965 B2 * | 6/2014 | Livshits | B01F 5/0057 |
| | | | 261/76 |
| 2002/0163089 A1 * | 11/2002 | La Crosse | B01F 3/0446 |
| | | | 261/76 |
| 2004/0113288 A1 * | 6/2004 | Korzeniowski | B01F 3/0446 |
| | | | 261/76 |
| 2004/0217491 A1 * | 11/2004 | Chapman | B01F 3/0446 |
| | | | 261/76 |
| 2006/0027938 A1 * | 2/2006 | Chapman | B01F 3/0446 |
| | | | 261/76 |
| 2007/0152355 A1 * | 7/2007 | Hartley | B01F 5/0413 |
| | | | 261/76 |
| 2009/0260282 A1 | 10/2009 | Hashimoto et al. | |
| 2009/0293357 A1 | 12/2009 | Vickers et al. | |
| 2010/0218423 A1 | 9/2010 | Walhovd | |
| 2013/0074408 A1 * | 3/2013 | Singh | A01G 31/02 |
| | | | 47/62 E |
| 2014/0075841 A1 * | 3/2014 | Degraff | A01G 27/005 |
| | | | 47/62 A |
| 2014/0321231 A1 * | 10/2014 | Peyman | B01J 13/04 |
| | | | 366/162.4 |
| 2015/0289463 A1 * | 10/2015 | Moriarty | A01G 31/02 |
| | | | 47/62 R |
| 2016/0044880 A1 | 2/2016 | Matsuno et al. | |
| 2016/0106115 A1 * | 4/2016 | Wu | A01G 31/06 |
| | | | 47/62 N |
| 2018/0000026 A1 * | 1/2018 | West | A01G 31/02 |

* cited by examiner

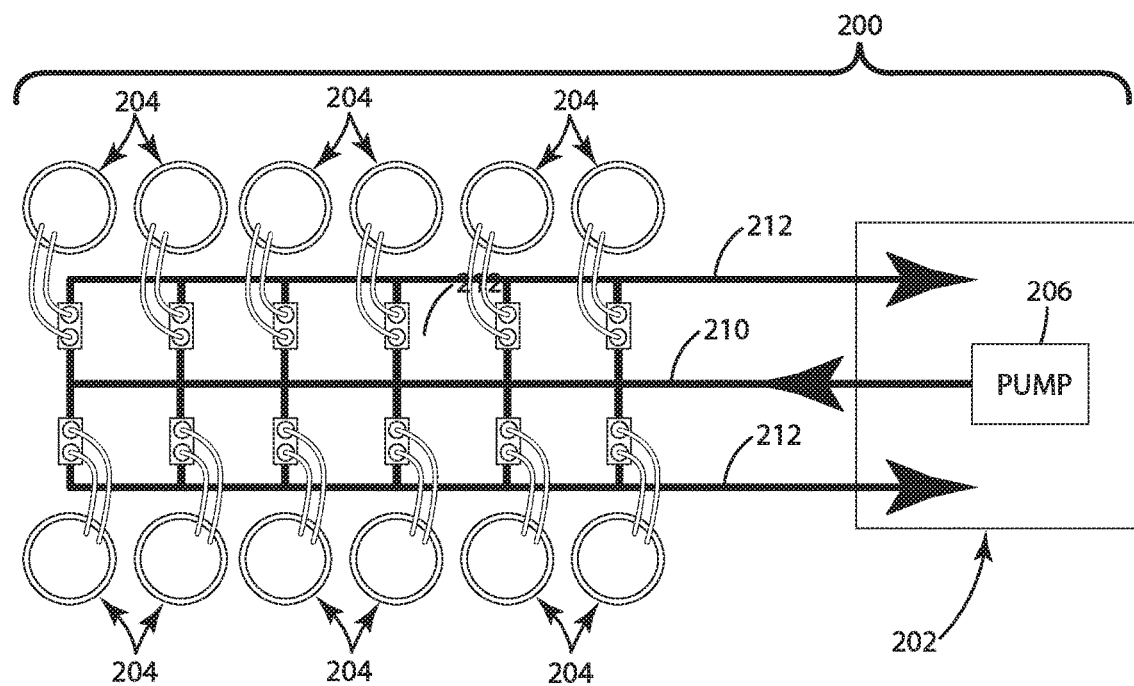
Fig. 2
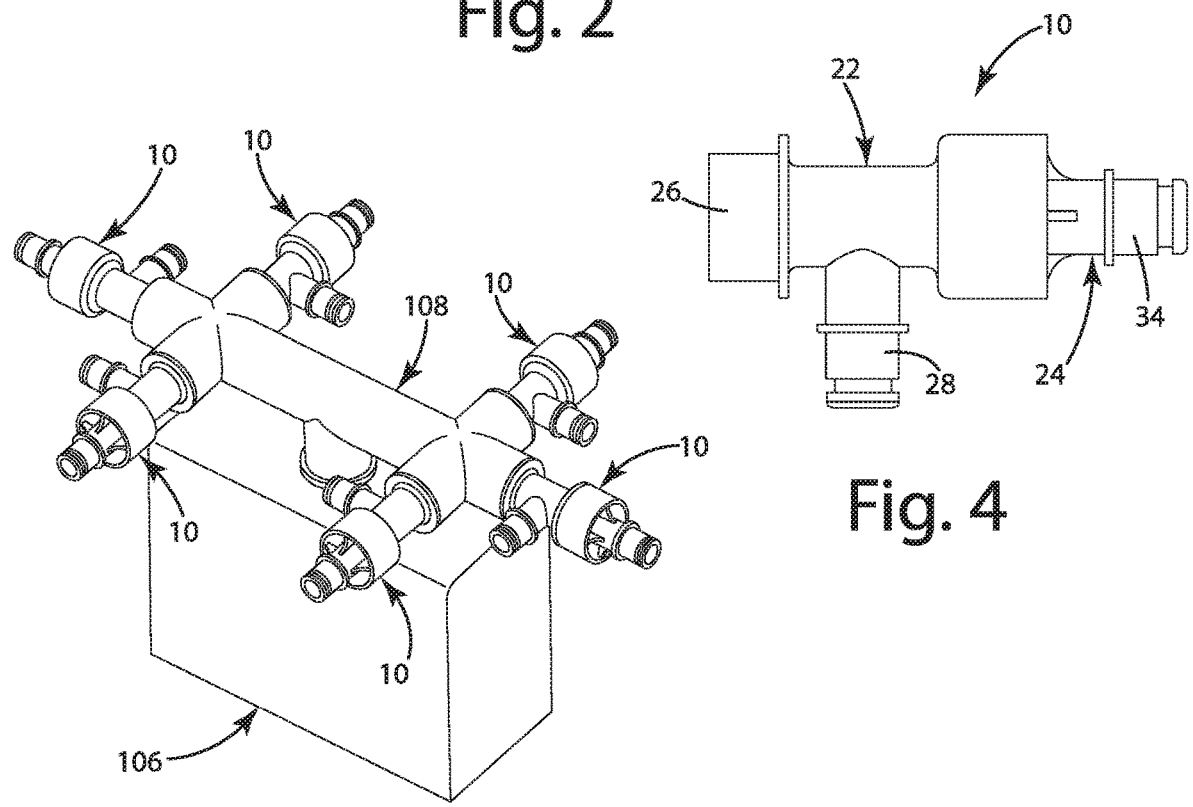
Fig. 3
Fig. 4

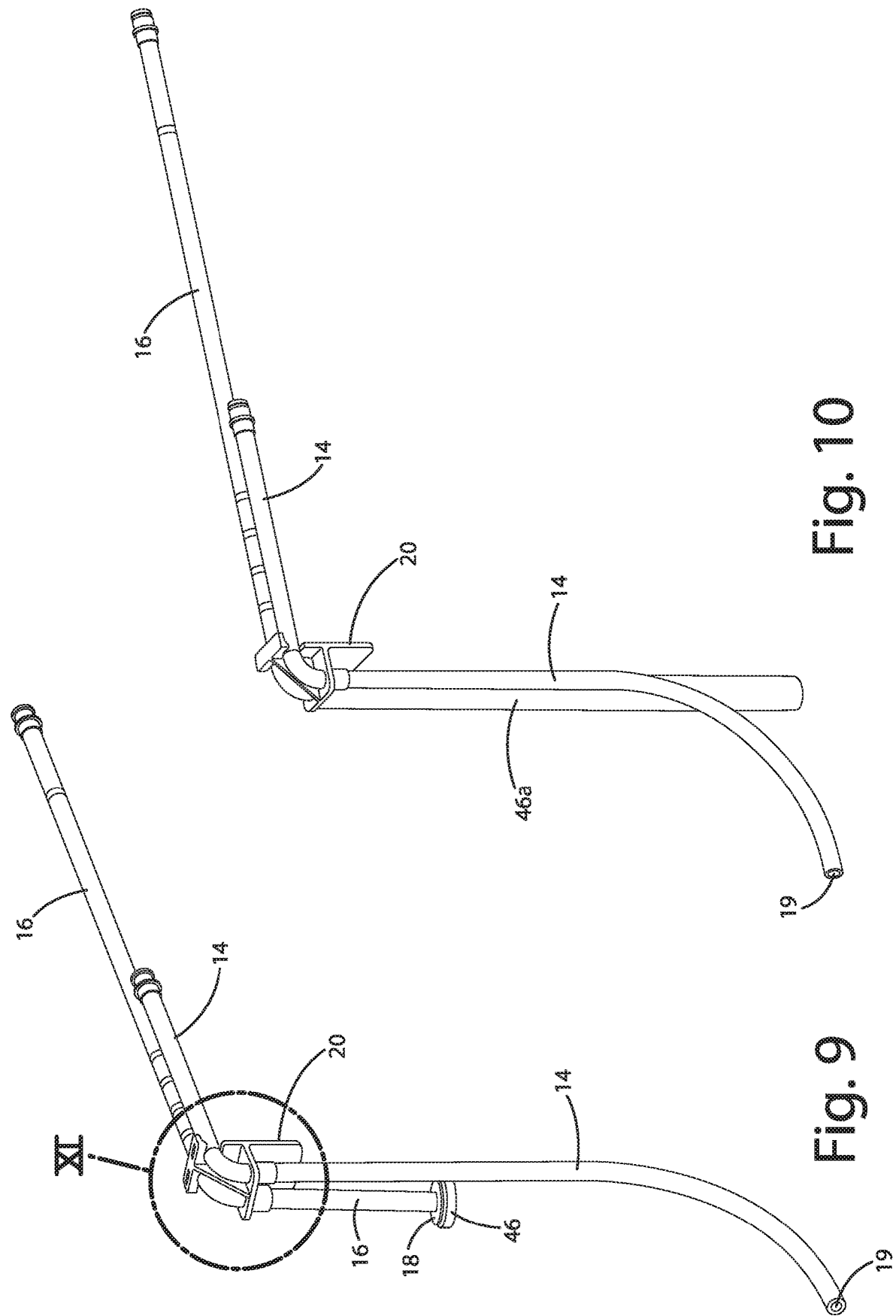

HYDROPONIC NUTRIENT AERATION AND FLOW CONTROL DEVICE AND SYSTEM

BACKGROUND OF THE INVENTION

The present invention relates to hydroponics, and more particularly to hydroponic nutrient circulation systems.

Hydroponics is the method of growing plants without soil, using a solution of water and dissolved mineral and/or organic nutrients. Only the roots are immersed in the nutrient solution, and sometimes only the tips of the roots are immersed. Because soil nutrients are not available to the plants, it is critical that all of the necessary nutrients be added and maintained in the correct ratios in the nutrient solution. Hydroponic nutrient solutions must be monitored to ensure that nutrient concentration, oxygen concentration, pH, and temperature are within desired ranges.

Hydroponic systems are widely used by hobbyists and commercial growers. Growers employ a number of techniques to provide access to nutrients and to maintain the proper nutrient mixture for the plants.

Hobbyists with limited production needs may use static systems in which the plants are supported above a tank of nutrient solution with only the roots extending into the solution. In these systems, to assure the roots are continuously immersed, water must be added to replace the water loss to transpiration and evaporation. The plants could die if the roots are out of the solution for only a few hours. Nutrient mixture ratios, pH, and temperature in each grow tank must be monitored and adjusted as nutrients are consumed by the plants and as nutrient concentration changes due to water level changes. Additionally, the plant roots must have access to oxygen. It is common practice to bubble air through the nutrient solution so that the solution absorbs sufficient oxygen to meet plant needs. Air pumps and air stones, the same as those used in aquariums, are used for this purpose.

It is common for commercial growers and hobbyists, looking for more efficient ways to grow larger crops, to use centralized reservoirs of nutrient solution delivered to multiple grow tanks using pumps. These types of systems are referred to as "recirculation systems." They are more practical than static systems for growing large crops because nutrient solutions can be monitored and maintained in a single location rather than in each grow tank.

In one type of recirculation system, the solution from each growing tank is returned to the reservoir through gravity return pipelines. Automatic keep-full valves maintain reservoir level by adding water to the reservoir as the level drops. Proper nutrient mixture, pH, and temperature can be maintained for all of the grow tanks in the network by monitoring and adjusting the reservoir nutrient solution. The grow tanks still require aeration, which typically is provided by a large air pump feeding a distribution manifold so that air may be delivered to each grow tank. These systems require the grow tanks to be located above the level of the reservoir so that the gravity return lines can be used.

In another type of recirculation system, the multiple grow tanks and the reservoir all are at the same level. The grow pots are all connected to a common drain line so that they all have the same liquid level as in the nutrient reservoir. A pump in the reservoir delivers nutrient solution to each grow pot to provide a continuous supply of fresh nutrient. Air is supplied by way of an air pump with air stones in each grow tank. Drainpipe size is generally large to assure that a common level is maintained in all of the grow tanks and to assure that aggressive roots do not plug the drain ports in the grow tanks.

Systems that use multiple grow tanks connected at the bottom to a common reservoir at the same level as the grow tanks must all operate at the same liquid level as the reservoir and each other. This is not ideal if it is desired to adjust the level of an individual grow tank to accommodate different plants and root growth issues, or to use tiered benches to locate grow tanks at different elevations. The hydroponic method known as Deep Water Culture is often used in these systems. Plants sit above the nutrient solution with just some of the roots immersed in the solution. Grow tanks may have one or more plants. These systems are not suitable if roots require different nutrient levels or grow tanks are at different elevations.

Certain aspects of recirculation systems are less than ideal. The drain piping system must connect the reservoir directly with each grow tank. This requires leak-tight joints for grow tank gravity drain ports to connect with the drain line. Particularly in systems where grow tanks are elevated relative to the reservoir, this can be a complex, three-dimensional network of pipes and joints, thereby adding installation expense and making modifications problematic. Reconfiguring pipelines requires a shutdown of the operation, potentially leaving roots exposed to air. Reconfiguring pipelines also can take significant time, which adds to the risk of plant damage.

Aeration also presents problems. Aeration requires air pumps and lines, which adds cost. Air lines must be routed to all grow tanks adding to the network cost and complexity.

There are other problems related to the specific type of grow tank. The grow tanks that employ the hydroponic system known as Net Film Technique (NFT) use a thin film of liquid nutrient flowing from one end to the other in the bottom of a trough-type tank. This type of grow tank is widely used, for example, in commercial vegetable and herb operations. Many plants can grow side-by-side along the length of the trough. The plants sit in holes in the cover of the trough with the tips of their roots wetted by the thin layer of flowing nutrient. There are two basic problems with such tanks. First, gravity drains in these tanks may allow all nutrient solution to drain out quickly in the event of a power interruption or pump failure. This can result in the loss of an entire crop. Second, because these tanks are often rather long, the flow of nutrient can get restricted by heavy root growth. If plants are not monitored closely, the problem may not be found until significant damage has occurred.

SUMMARY OF THE INVENTION

The present invention provides a hydroponic nutrient aeration and flow control (NAFC) device and system, which both aerates and controls the flow of the nutrient solution.

The NAFC device has no moving parts. The NAFC device includes a nutrient supply intake, a grow tank return intake, a nozzle communicating with the nutrient supply intake, a mixing chamber in fluid communication with both the nozzle and the grow tank return intake, an outlet port in fluid communication with the mixing chamber and aligned with the nozzle, and a grow tank supply outlet in fluid communication with the outlet port. Nutrient from the nutrient reservoir flows into the nutrient supply intake, through the nozzle, and into the mixing chamber. Nutrient and/or air from the grow tank drain line is drawn through the grow tank return intake and into the mixing chamber. The two nutrient flows and/or the air are admixed within the mixing chamber, and a portion of the admixture is directed into the outlet port for delivery to the grow tank through the grow tank supply outlet.

The NAFC system includes an NAFC device within each nutrient supply line to each grow tank. More specifically, the system includes a nutrient reservoir, a plurality of grow tanks, a nutrient supply system for supplying nutrient from the reservoir to the grow tanks, a nutrient return system for returning nutrient from the grow tanks to the nutrient reservoir, and a plurality of NAFC devices—with each NAFC device within one of the nutrient supply lines to one of the grow tanks.

In an alternative embodiment, the NAFC device may be used as a hydroponic nutrient aerator (i.e. without a flow control function).

The present invention provides significant improvement in hydroponic system efficiency. The nutrient solution can be mixed, aerated, and circulated to multiple grow tanks from a nutrient reservoir; and the nutrient level in each grow tank may be controlled or adjusted independently of the other grow tanks. The present invention also eliminates the need for common drain lines, improving safety and plumbing flexibility, and reducing cost. The present invention also eliminates the need for holes and leak-tight connections in the grow tanks for nutrient circulation. Further, the present invention eliminates the need for air pumps, reducing system component and installation costs.

These and other advantages and features of the invention will be more fully understood and appreciated by reference to the description of the current embodiment and the drawings.

BRIEF DESCRIPTION OF THE DRAWINGS

FIG. 2 is a perspective view of a Type II hydroponic nutrient circulation system embodying the present invention.

FIG. 3 is a perspective view of a pump and a manifold used in the Type I system.

FIG. 4 is an elevational view of the nutrient aeration and flow control (NAFC) device embodying the present invention.

FIG. 9 is a perspective view of the nutrient supply line and the nutrient return line for a grow tank.

FIG. 10 is a perspective view similar to FIG. 9 but with a different filter on the return line.

DESCRIPTION OF THE CURRENT EMBODIMENTS

Figure 1:
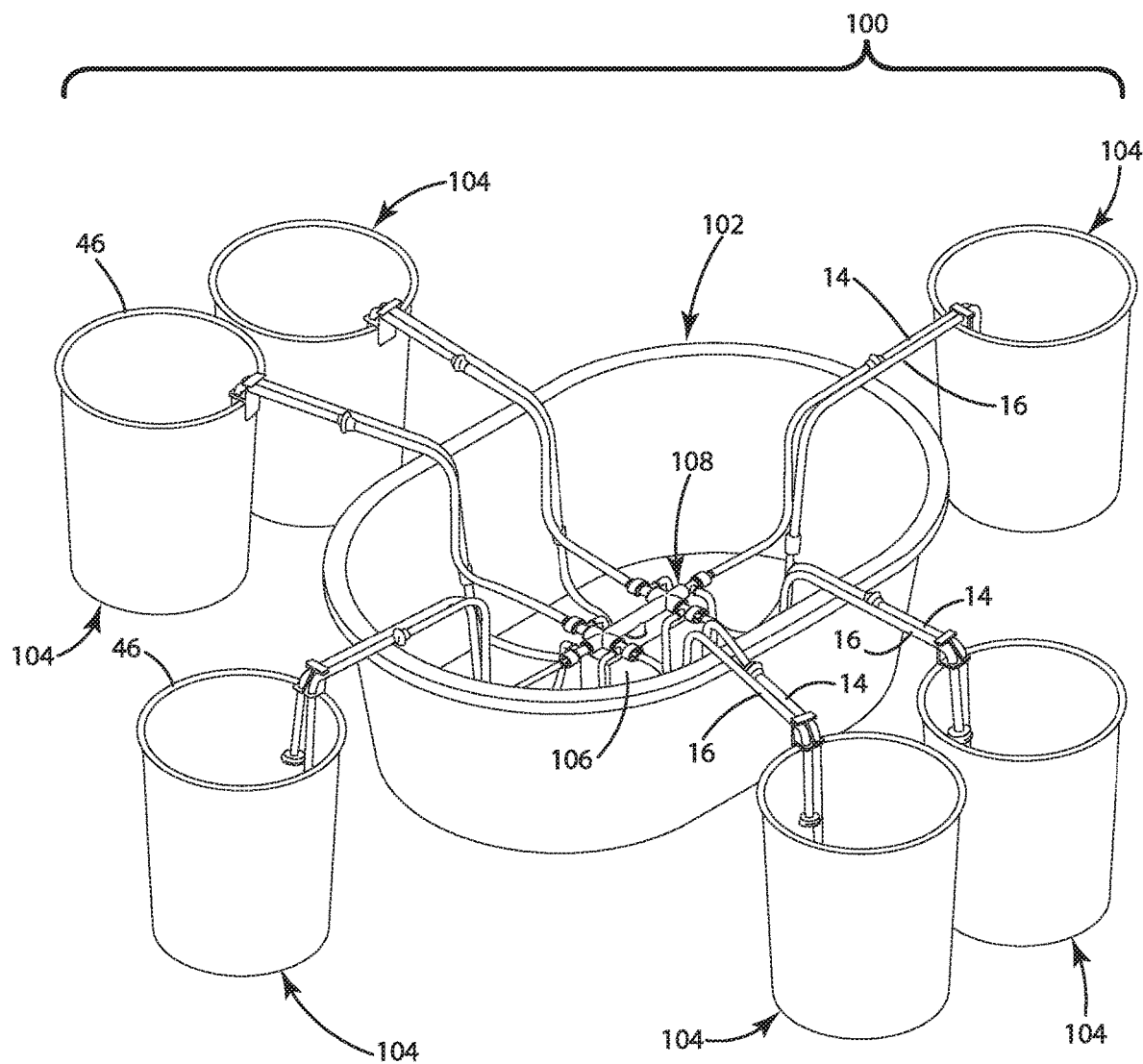
FIG. 1 is a perspective view of a Type I hydroponic nutrient circulation system embodying the present invention.
Figure 5:
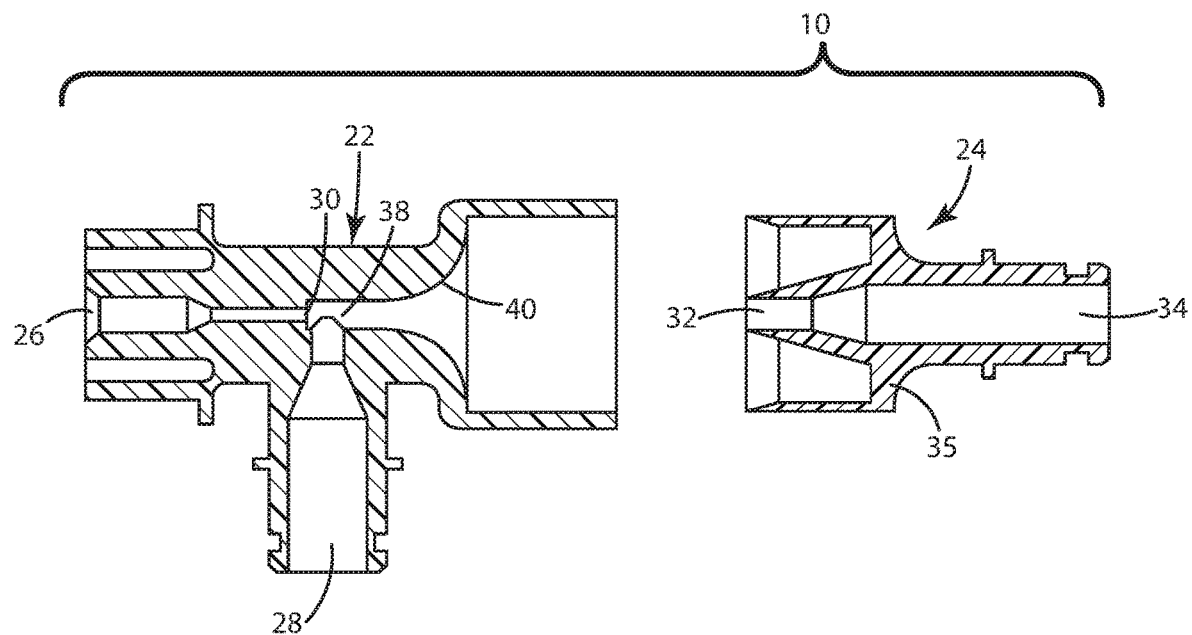
FIG. 5 is an exploded sectional view of the NAFC device.

Before the embodiments of the invention are explained, it is to be understood that the invention is not limited to the details of operation or to the details of construction; and the arrangement of the components set forth in the following description or illustrated in the drawings. The invention may be implemented in various other embodiments and may be practiced or carried out in alternative ways not expressly disclosed herein.

In addition, it is to be understood that the phraseology and terminology used herein are for the purpose of description and should not be regarded as limiting. The use of "including" and "comprising" and variations thereof encompasses the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one or more of X, Y or Z individually, and any combination of any one or more of X, Y and Z, for example, X, Y, Z; X, Y; X, Z; and Y, Z.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

Embodiments of the hydroponic nutrient aerator and flow control (NAFC) devices are illustrated in the drawings and designated 10 and 310. Before the NAFC devices are described in detail, it is noted the NAFC devices may be used in two types of hydroponic installations. A "Type I" installation includes grow tanks arrayed in proximity to the nutrient reservoir. In this type of system, the NAFC devices 10 are mounted to a manifold connected to a reservoir pump. A "Type II" installation includes a nutrient reservoir remote from the grow tanks. In this type of system, the NAFC devices 310 are distributed throughout the system, with one NAFC device located near each grow tank.

I. Type I Hydroponic System

A Type I system is illustrated in FIG. 1 and generally designated 100. The system 100 includes a nutrient reservoir 102 and a plurality of grow tanks 104. Although six grow tanks 104 are depicted, the system 100 may include a greater or lesser number of grow tanks. The system 100 further includes a submersible pump 106 and a manifold 108, shown in greater detail in FIG. 3. The pump 106 and the manifold 108 are submersed in the nutrient reservoir 102. An NAFC device 10 is mounted to each outlet of the manifold 108.

The grow tanks 104 may be different in size and number of plants, may sit at different elevations, and may operate at different liquid levels. The grow tanks 104 may individually employ different hydroponic techniques such as Deep Water Culture or Net Film Technique, as well as any other technique where it is desired to maintain a volume of nutrient solution matching the condition of the nutrient reservoir. The grow tanks 104 are not connected to each other by way of the common drain line. For simplicity, bucket covers, net pots, and/or other accessories are not shown in conjunction with the grow tanks 104, although the use of such component and accessories would be conventional as known to those skilled in the art.

II. Type I Nutrient Aerator and Flow Control (NAFC) Device

The NAFC device 10 will be described in conjunction with the Type I System 100. Each NAFC device 10 is part of an NAFC assembly 12, which additionally includes a supply hose or line 14 and a return hose or line 16.

The NAFC assembly 12 provides independent circulation, aeration, and level control to the grow tank 104 to which the NAFC assembly is connected. The NAFC assembly 12 delivers fresh nutrient and aeration through a supply hose 14 (see also FIG. 9) passing through a hole in the grow tank cover (not shown) to the bottom of the grow tank 104. As the level of nutrient in the grow tank 104 rises, the NAFC assembly 12 withdraws liquid from the surface of the nutrient and returns the withdrawn nutrient to the reservoir 102 through a return hose 16, which also is installed in a hole in the grow tank cover. The level of the nutrient is maintained within the grow tank 104 at the lower end 18 of the return hose 16. The level of the nutrient can be easily adjusted by moving the lower end 18 of the return hose 14 to the desired level.

Because the supply hose 14 and the return hose 16 extend over the top of the grow tank 104 and are secured in position by a clip 20, which in turn is removably securable to the rim of the grow tank, no holes are required in the grow tank. This arrangement assures there are no leaks, and that grow tanks 104 can be repositioned as needed without downtime or plumbing expense. The incoming nutrient introduced into the bottom of the grow tank 104 lifts stale nutrient, so the stale nutrient can be drawn off and returned to the nutrient reservoir 102. In this way, the nutrient within each grow tank 104 is circulated and maintained in the same condition as the nutrient in the nutrient reservoir 102.

Further, the NAFC assembly 10 has an inherent aerating characteristic, which aerates the nutrient in the nutrient reservoir 102, and which also mixes air and nutrient solution as the nutrient solution flows to the grow tank 104. This eliminates the need for a separate air pump.

The NAFC device 10 is illustrated in FIGS. 4-7. The NAFC device 10 is a multiple-function, fluidic device with no moving parts. The NAFC device 10 includes an aerator 22 and a receiver 24. The receiver 24 is closely received and secured within the aerator 22. The aerator 22 includes a nutrient inlet 26 and an air inlet 28 for receiving nutrient and air respectively. The aerator 22 further includes a nozzle 30 and a mixing chamber 38. The nozzle 24 includes a receiver port 32 and an outlet 34. The receiver port 32 is aligned with the nozzle 30.

Figure 6:
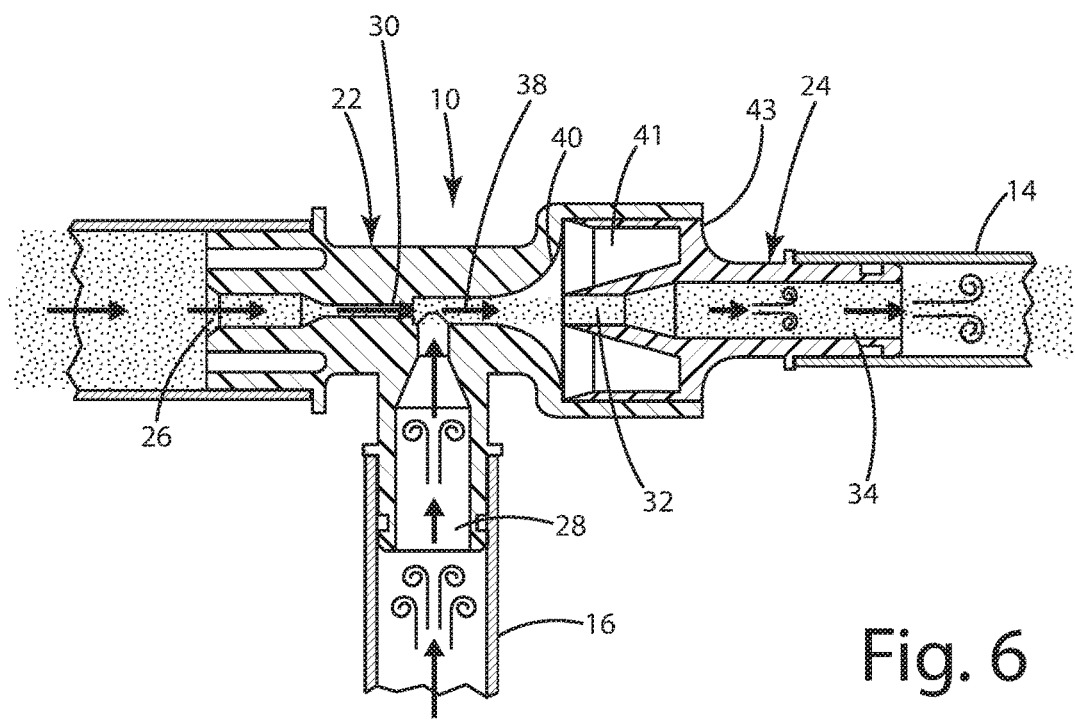
FIG. 6 is a sectional view of the NAFC device in a first mode of operation.
Figure 7:
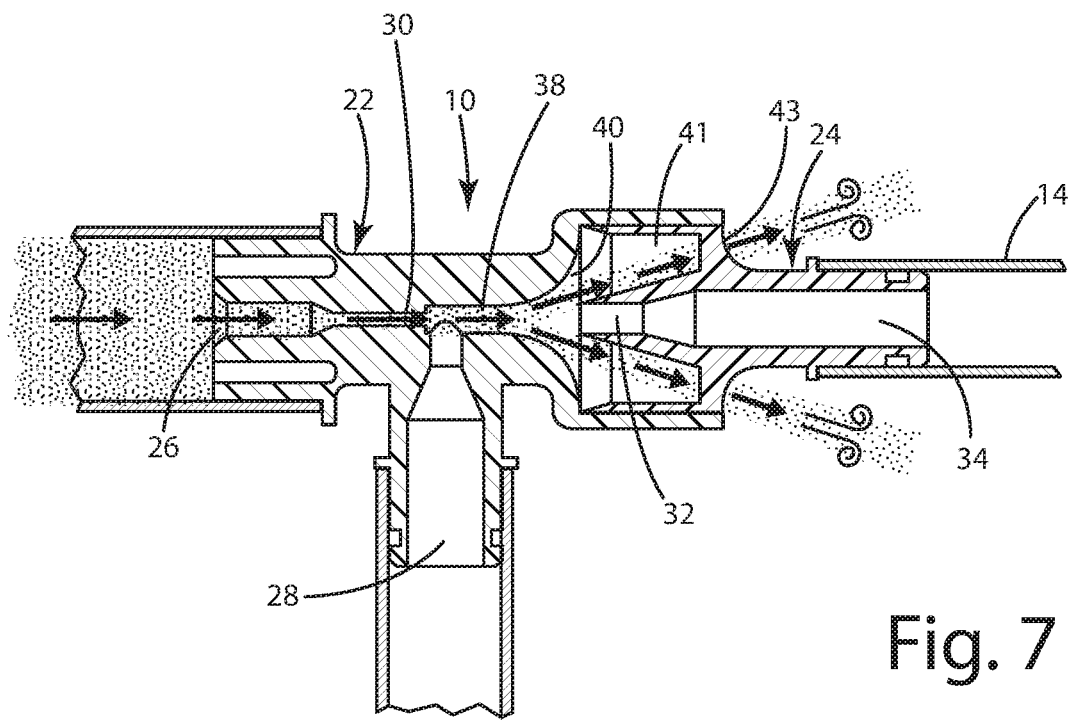
FIG. 7 is a sectional view of the NAFC device in a second mode of operation.
Figure 8:
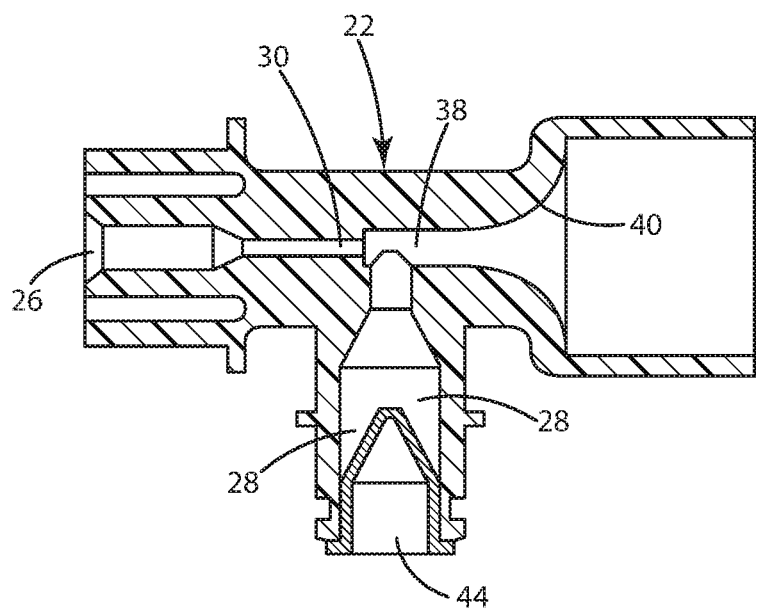
FIG. 8 is a sectional view of the aerator portion of the NAFC device and additionally including a check valve.

As illustrated in FIGS. 6-7, the nutrient inlet 26 is connected to the manifold 108; the grow tank return hose 16 is connected to the air inlet 28; and the grow tank supply hose 14 is connected to the output 34.

As illustrated in FIG. 6, under the pump pressure at the inlet 26, a high velocity jet of nutrient solution exits the nozzle 30 into the mixing chamber 38. In the first mode of operation, in which the end 18 of the grow tank return hose 16 is above the liquid level in the grow tank 104, air is aspirated into the region surrounding the nutrient jet in the mixing chamber 38. This enables the nutrient jet to remain as a coherent jet that travels in a straight path and impinges on the receiver port 32. Both the liquid jet and some air enter the receiver port 32. This mix of fluids is conveyed to the grow tank 104 by way of the grow tank supply hose 14. During the travel to the grow tank 104, the air and the liquid mix; and oxygen is absorbed into the nutrient solution. Some of the air aspirated into the nutrient jet bypasses the receiver 32 and flows into the bypass chamber 41, through the bypass outlet 43, and into the reservoir 102. In this way, the NAFC devices 10 aerate the nutrient within the reservoir 102 as well as in the grow tanks 104.

FIG. 7 illustrates the operation of the NAFC device 10 in a second mode when the nutrient level in the grow tank 104 rises above the end 18 of the grow tank return hose 16 within the grow tank 104. The nutrient liquid is then aspirated and drawn back through the grow tank return hose 16 and into the NAFC device 10 where it mixes with the nutrient jet in mixing chamber 38. This causes the nutrient jet to spread and contact the curved wall 40 that surrounds the nutrient jet. The nutrient jet is deflected by way of Coanda effect or wall attachment effect, and is diverted away from the receiver port 32. Flow to the grow tank is diminished or even stopped completely, so that the flow of liquid in the grow tank return hose 16 causes the grow tank level to drop back to the end 18 of the hose at which point air is again aspirated and another cycle of filling is initiated.

The NAFC device 10 cycles between the mode illustrated in FIG. 6 and the mode illustrated in FIG. 7 continue as long as the pump operates. This maintains the level in the grow tank at the end 18 of the grow tank return hose 16 and also circulates aerated nutrient. Complete turnover time for a given volume of grow tank nutrient can be controlled by the selection of the NAFC device nozzle diameter and the pump pressure. For example, an NAFC device 10 with a nozzle diameter of 0.082 inches and a pump pressure of 6 psi will cycle the nutrient solution in a five-gallon grow tank twice in one hour. Pumps may be run continuously or on a timer.

Figure 16:
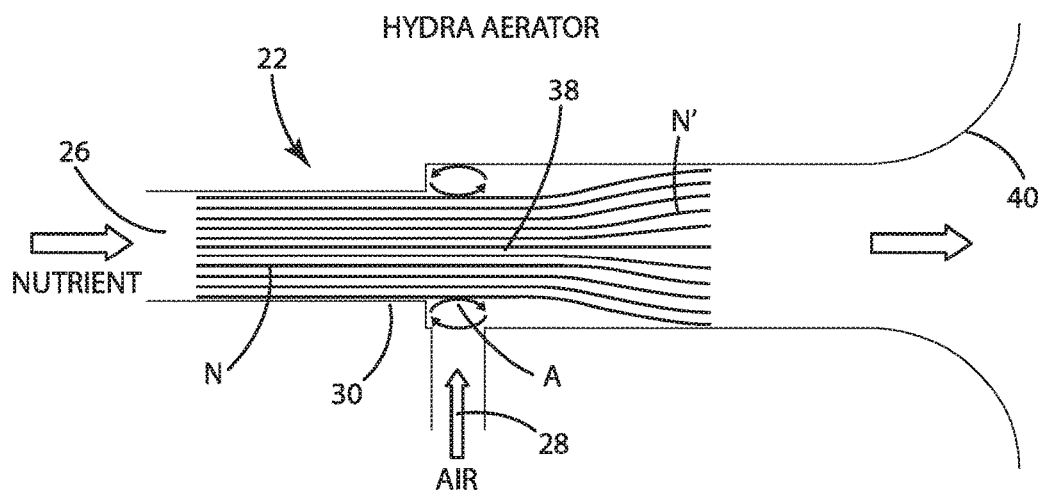
FIG. 16 is a schematic illustration of the nutrient flow within the aerator 22.

The aeration of the nutrient stream within the NAFC device 10 is schematically illustrated in FIG. 16. Nutrient N enters the device through the intake port 26 and passes through the nozzle 30 to create the jet. The jet mixes with air received through the intake port 28 and the aerated nutrient N' results.

Figure 17:
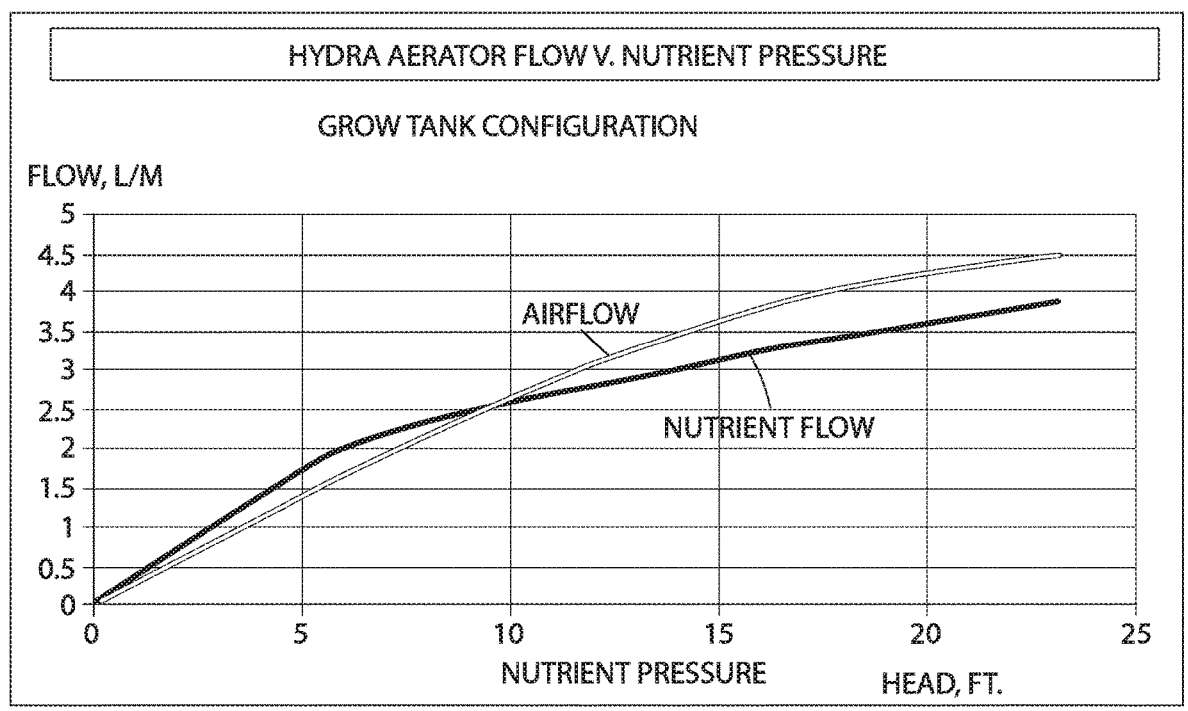
FIG. 17 is a graph illustrating the relationship between nutrient flow, airflow, and nutrient pressure.

FIG. 17 is a graph illustrating the nutrient flow and the airflow through the NAFC device 10 at various nutrient head pressures. The nutrient flow exceeds the airflow below a nutrient head pressure of approximately 10 Ft. And the nutrient flow is less than the airflow above that nutrient head pressure.

Figure 11:
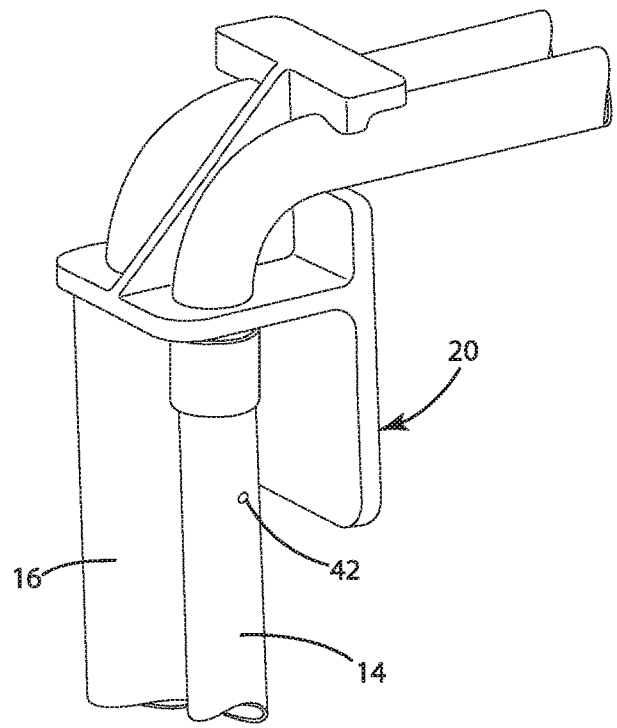
FIG. 11 is a perspective exploded view of the area within the circle XI in FIG. 9.

Because the end of the grow tank supply hoses are submerged, an anti-siphon means is provided to introduce air into the hoses when the pump is off. Anti-siphon means may be a small hole 42 in the side of the hose above the nutrient level as illustrated in FIG. 11.

Further, because the grow tank return hose 16 can potentially be submerged at its end 18 when the pump turns off, a check valve 44 may be placed in the intake port 28 to prevent the contents of the nutrient tank from siphoning into the grow tank if the grow tank nutrient level is below the nutrient reservoir level. If the grow tank nutrient level is above the nutrient reservoir level when the pump shuts off, the grow tank nutrient level will drop to the set point which is the vertical position of the end 18 of the hose 16 in the grow tank. The check valve 44 is preferably a duckbill type, but other check valves could be used. A low opening differential pressure is preferred so the aspiration of nutrient from the grow tank can occur at the fastest rate.

FIGS. 9 and 10 illustrate the mounting of the hoses 14 and 16 on the grow tank 104. A bracket 20 attaches to the rim 46 of the grow tank 104 and directs the hoses downwardly into the grow tank. The supply hose 14 extends to a low level (as described above), and the end 19 preferably is positioned near the horizontal center of the grow tank 104, so that nutrient and air are introduced near the middle of the lower portion of the grow tank.

As illustrated in FIG. 9, the end 18 of the return hose 16 includes a filter 46 that prevents roots from entering the hose 16 and potentially blocking the hose. The filter 46 preferably is a porous plastic material. A porous plastic material is preferred over meshes or screens because roots can penetrate the openings in those types of filters. The return hose 16 may be slid within the bracket 20 so that the end 18 and the filter 46 may be placed at the desired nutrient solution level for the grow tank 104. The desired nutrient level may differ between plant pot sizes and may also change as the roots develop. In some cases, as the roots grow, the level will be set lower so that the root tips remain submerged while the root mass may be exposed to air to improve oxygen absorption. Preferably, the return hose 16 is marked with a graduated scale indicating the depth of the nutrient liquid level. The system holds the liquid level accurately at the location of the end 18 of the return hose 16.

FIG. 10 illustrates a tubular filter or equalizer tube 46a, which may be used in place of the filter 46 illustrated in FIG. 9. The return hose 16 is located inside of the tubular filter 46a with its lower end 18 at the level set point. The inside diameter of the tubular filter 46a is larger than the outer diameter of the return hose 16. The porosity of the tubular filter 46a enables the liquid level inside the tubular filter to equalize with the grow tank level. The tubular filter 46a offers increased filter area for longer filter life.

III. Type II Hydroponic System

A Type II System is illustrated in FIG. 2 and generally designated 200. The system 200 includes a nutrient reservoir 202 and a plurality of grow tanks 204. The nutrient solution within the nutrient reservoir 202 is distributed to the grow tanks 204 by way of a network of pressure pipes 210 and return pipes 212. The pressure and return pipes 210, 212 can be fitted with quick disconnects at each grow tank location so that each NAFC device 10 may be snapped into or removed from the pipes without interrupting the system operation. The reservoir 202 and the grow tanks 204 may be similar to, or different from, the reservoir 102 and the grow tanks 104 respectively.

IV. Type II Nutrient Aerator and Flow Control (NAFC) Device

Figure 12:
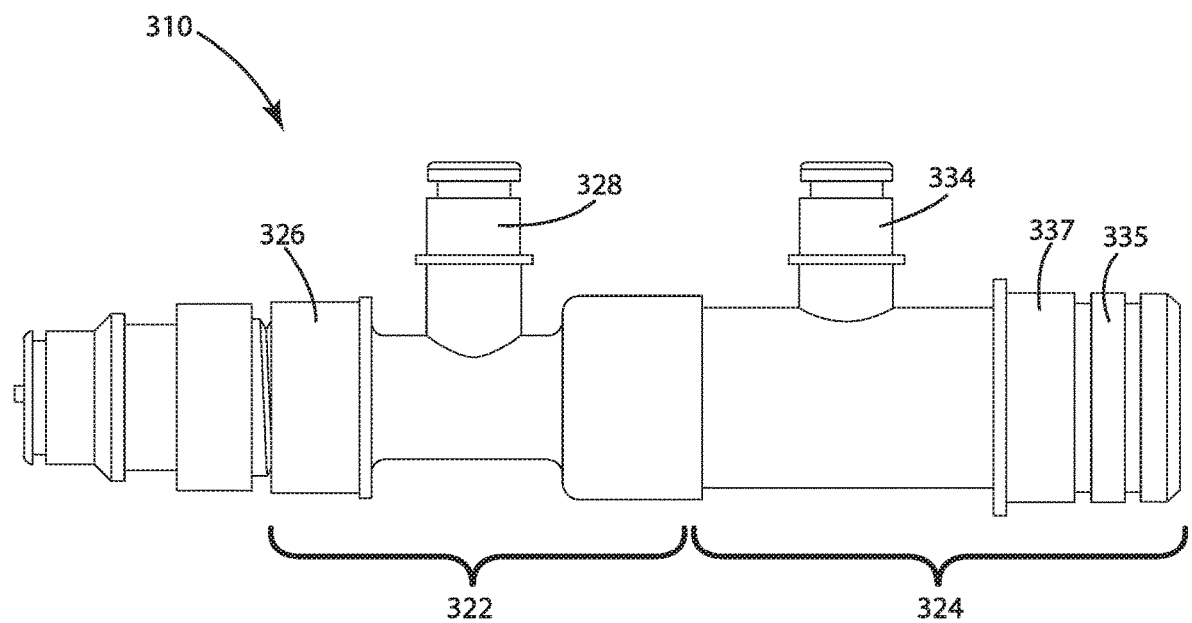
FIG. 12 is an elevational view of an alternative embodiment of the NAFC device.
Figure 13:
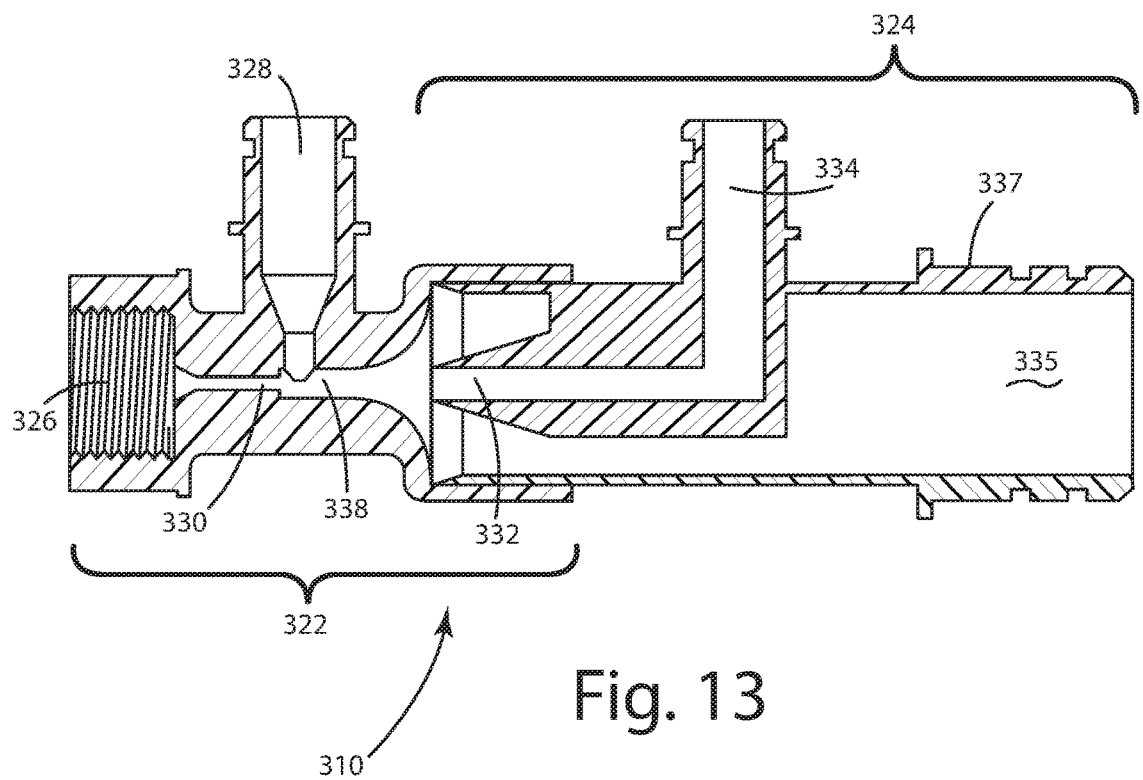
FIG. 13 is a sectional view of the alternative embodiment of the NAFC device.

FIGS. 12 and 13 illustrate the NAFC device 310 for a Type II hydroponic system. The NAFC device 310 includes an aerator 322 and a receiver 324.

The aerator 322 is highly similar structurally and functionally to the aerator 22 previously described. The elements in the aerator 322 that correspond to elements in the aerator 22 are identified by the corresponding number preceded by the digit "3". Accordingly, the inlet port 326 corresponds to the inlet port 26, and so forth. The primary difference between the aerator 322 and the aerator 22 is that the inlet port 326 is threaded to receive a mating threaded component.

The receiver 324 is highly similar functionally to the aerator 22 previously described. The elements in the receiver 324 that correspond to elements in the receiver 24 are identified by the corresponding number preceded by the digit "3". Accordingly, the receiver port 332 corresponds to the receiver port 32, and so forth. Two differences between the receiver 324 and the receiver 24 are that (a) the grow tank supply line port 334 extends transversely from the NAFC device 310 and (b) the outlet 335 includes an external fitting 337.

Figure 14:
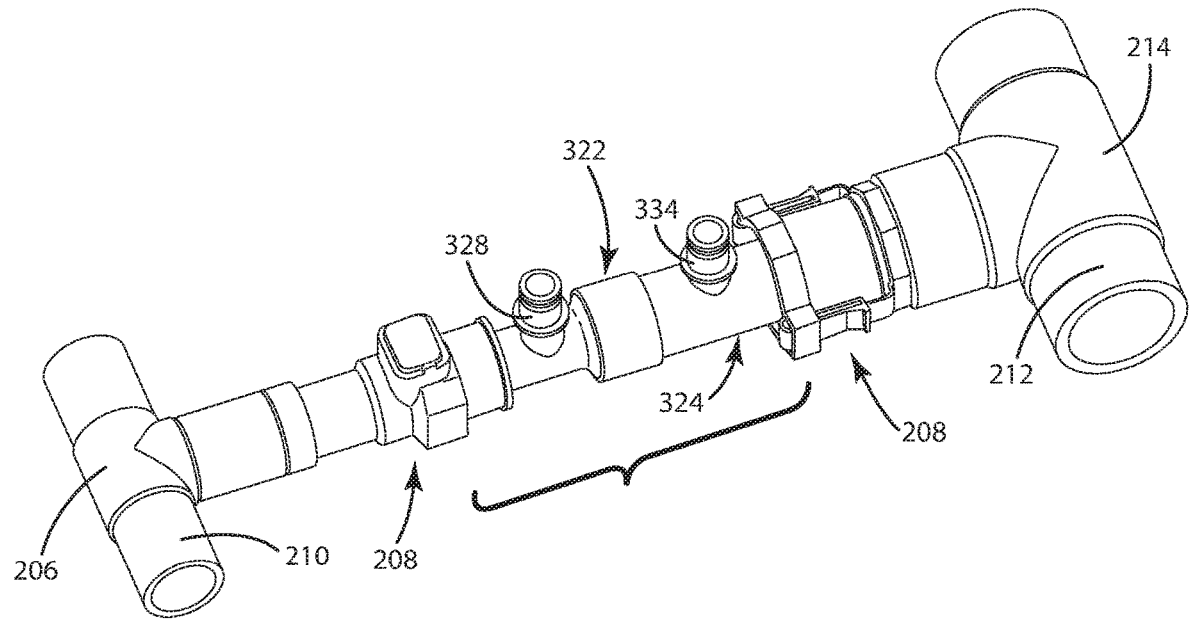
FIG. 14 is a perspective view of the alternative embodiment of the NAFC device connected to both nutrient supply and nutrient drainage lines.

FIG. 14 illustrates the incorporation of the NAFC device 310 into the Type II system 200. The pressure line 210 is fitted with a tee 206 at each growing tank 204 along with a quick coupling 208 having a shut-off valve (not visible). Similarly, the drain line 212 is fitted with a tee 214 along with a quick coupling having a shut-off valve (not visible). All of these components are fluidly and securely interconnected using techniques well known to those skilled in the art.

The valves enable the NAFC unit 310 to be installed and removed without shutting off the pump. This enables modifications and service to be performed on individual growing stations without interrupting system operation. The drain line is always filled with nutrient solution at the reservoir head pressure. The check valves prevent the nutrient from leaking out when the NAFC device 310 is not installed.

Preferably, the NAFC device 310 is fitted with male quick-connect fittings. When installing the NAFC into a pressurized line, the NAFC grow tank connections are made first. Then the NAFC outlet is connected to the drain line. Then the NAFC inlet fitting is inserted into the quick coupler, which opens the shut-off valve, and operation begins. When removing the NAFC device 310, the quick coupling is first disconnected from the pressurized line, and then the NAFC device is disconnected from the drain coupling and the grow tank tubes.

Figure 18:
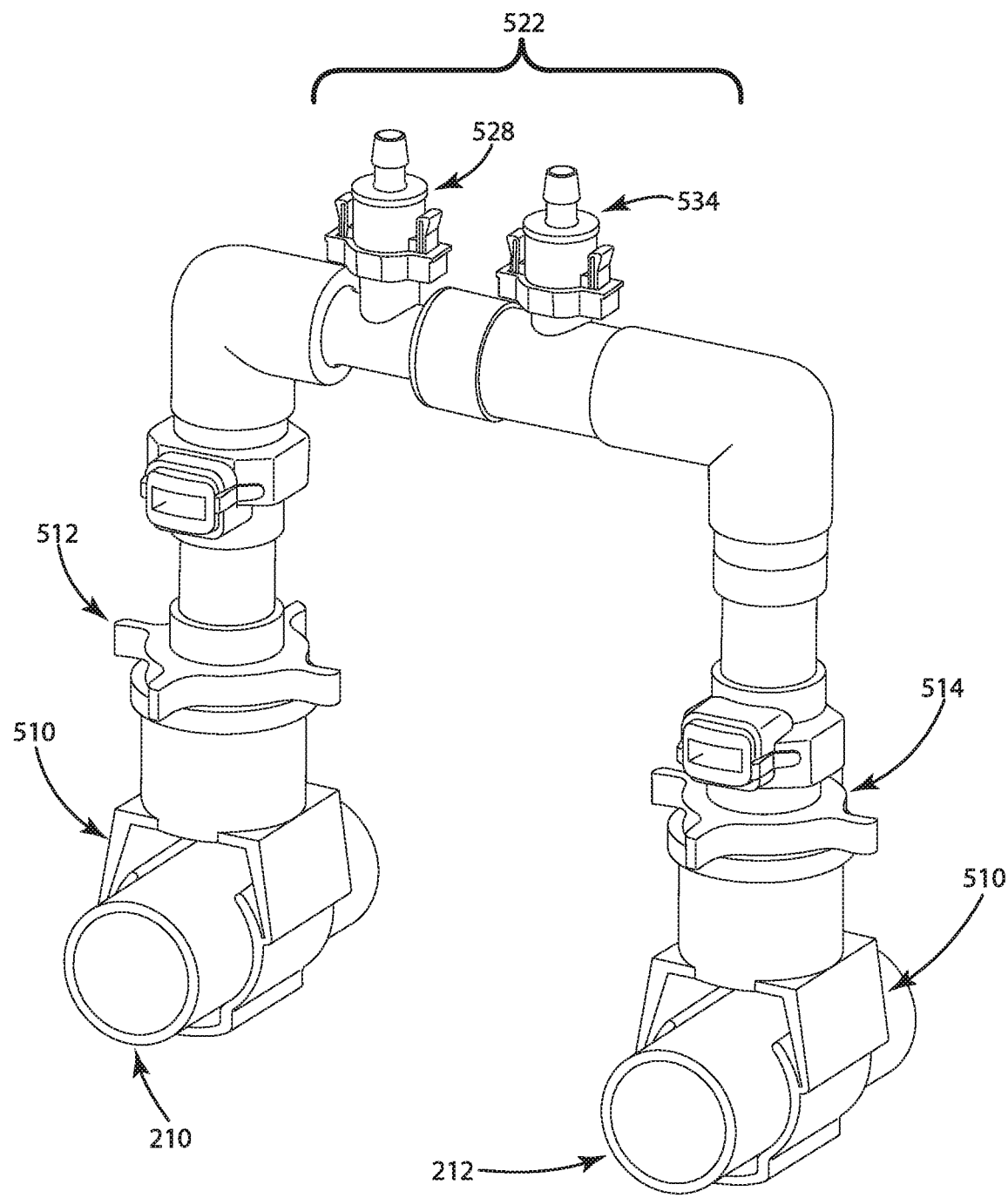
FIG. 18 is a perspective view of a saddle connection assembly including the second alternative embodiment of the NAFC device.

FIG. 18 illustrates an alternative embodiment to the arrangement illustrated in FIG. 14 for connecting the NAFC device 310 in a Type II system 200. The FIG. 18 design incorporates pipe saddles 510 that may be attached to the nutrient supply line 210 and the nutrient drain line 212. The saddles 510 include sprinkler-system, snap-on, self-tapping tees 512 and 514 to connect the NAFC device 310 to the lines 210 and 212 respectively. The tees 512 and 514 simplify and reduce installation labor because the self-tapping tool is incorporated into the saddle 510. The saddles 510 can be added to an existing pipe run without draining the pipes. One suitable saddle is that made and sold by King Innovations for use in underground sprinkler systems.

V. High Efficiency Aerator

Many hydroponic growers would like to improve the aeration in their recirculation systems. Air pumps, air stones, and associated airlines require maintenance and may not always provide sufficient oxygen to the plant roots. Accordingly, there is a need for improved aeration in many existing hydroponic recirculation systems.

There are alternatives to air pumps for aeration, but these alternatives create problems when used in multiple tank recirculation systems. Pumps fitted with a venturi aspirate air and mix it with nutrient. These pumps are too large and too expensive to connect to each grow tank to circulate individual nutrient solution. If a large, single-venturi pump is used to augment nutrient aeration and circulation, such a pump may increase the flow rate beyond the grow tank drain capacity or not provide sufficient oxygen if flow is limited. There are also aerators used for marine live wells and bait wells that are designed to operate with 500 GPH to 750 GPH or more. These marine aerators are impractical to circulate individual grow tank nutrient with their own pump, and would be problematic if mounted to each grow tank and supplied by a system pump. At high enough flow rate to provide enough air, the flow into the grow tanks would exceed drain capacity, leading to uneven nutrient levels and potentially even overflows.

The NAFC has a mode of configuration and operation ideal for this situation. When the receiver 24 is not installed in the aerator 22, the NAFC device may operate as a high-efficiency, low-liquid-flow-rate aerator. Configured in this mode, and designated NAFC-A, an aerator 22 may be mounted to each grow tank and supplied by a central recirculation pump. The individual aerators 22 have a relatively low flow rate, so grow tank capacity will not be exceeded. However, the aerator 22 generates a high velocity liquid jet, which creates a strong aspiration of air into the jet. The strength of the aspiration effect is reflected by comparing the strength of the vacuum head created by the NAFC-A with other aerators at their normal operating flow rate. The aerator 22 operating at 10 Ft. of head develops a liquid flow rate of 0.65 GPM or 39 GPH. This is a manageable flow rate for a typical 6-gallon grow tank drain system. This aerator produces a turnover rate of once every 6 minutes for a tank filled with 4 gallons of nutrient.

Figure 15:
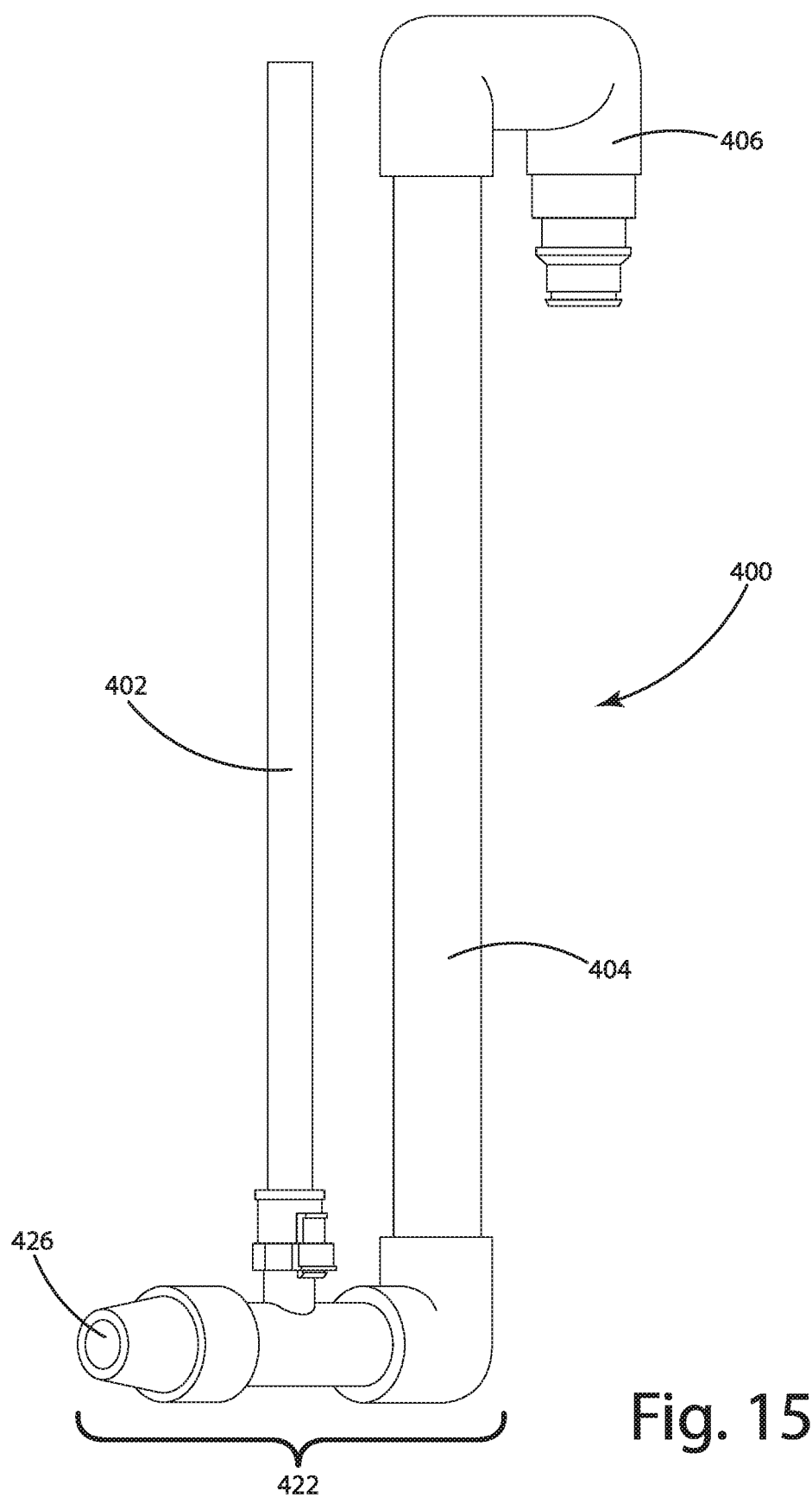
FIG. 15 is a perspective view of a grow tank aerator assembly embodying the present invention.

FIG. 15 illustrates one embodiment of a grow tank aerator assembly 400 incorporating the NAFC-A aerator 422. The assembly 400 includes an aerator 422, an air supply pipe 402, a nutrient inlet port 426, a discharge tube 404, and a U 406. Nutrient is received through intake port 426, and the nutrient flows through the aerator 422 to be aerated as described above. The aerated nutrient solution is outputted into the tube 404 for discharge through the U 406 into the grow tank (not shown in FIG. 15). The U 406 enables the aerator assembly 400 to be mounted on the rim of a grow tank.

VI. Conclusion

The NAFC devices provide unique features to improve the performance of hydroponic nutrient circulation systems. The devices aerate the nutrient solution without the need for air pumps, air stones, and air tube plumbing. The devices circulate aerated nutrient solution without gravity drains or a common drain line connecting grow tanks and the nutrient reservoir. The devices provide individual grow tanks with adjustable level control without the need for mechanical or electrical valves. The devices can empty grow tanks without requiring drain holes in the grow tanks. The devices enable grow tanks to be mounted at individual elevations. The devices enable different size grow tanks to be serviced from the same nutrient reservoir. The devices, when appropriately sized, provide rapid cycling (i.e. turnover) of grow tank nutrient solution. The devices may work with continuous or timed pump operation. The devices may be used with the most popular types of existing hydroponic systems. The devices enable an individual grow tank in a network to be serviced (i.e. moved, emptied, cleaned, replanted, etc.) without interrupting operation of the other tanks in the network.

The aerator version (i.e. the NAFC-A device) delivers high aeration to individual grow tanks without exceeding the existing drain capacity of the systems.

The above descriptions are those of current embodiments of the invention. Various alterations and changes can be made without departing from the spirit and broader aspects of the invention as defined in the appended claims, which are to be interpreted in accordance with the principles of patent law including the doctrine of equivalents.

This disclosure is illustrative and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as alternatives.

Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:
1. A hydroponic nutrient circulation system comprising:
a nutrient reservoir;
a plurality of grow tanks;
a nutrient supply system for supplying nutrient from the nutrient reservoir to the grow tanks, the nutrient supply system including a nutrient supply line extending into each grow tank;
a nutrient return system for returning nutrient from the grow tanks to the nutrient reservoir, the nutrient return system including a nutrient return line extending into each grow tank, each nutrient return line having a lower end at a desired nutrient level within the associated grow tank; and
a plurality of nutrient aeration and flow control (NAFC) devices, each NAFC device associated with the nutrient supply line and the nutrient return line of one of the grow tanks, each NAFC device including:
a nutrient supply intake to which the nutrient supply system is connected;
an air intake to which the associated nutrient return line is connected, wherein the air intake (a) receives air when the nutrient within the associated grow tank is below the lower end of the associated nutrient return line and (b) receives nutrient when the nutrient within the associated grow tank is above the lower end of the associated nutrient return line;
a nozzle in fluid communication with the nutrient supply intake;
a mixing chamber in fluid communication with the nozzle and with the air intake;
a receiver port in fluid communication with the mixing chamber and aligned with the nozzle;

a grow tank supply outlet to which the associated nutrient supply line is connected, the grow tank supply outlet in fluid communication with the receiver port; and a bypass chamber surrounding the grow tank supply outlet and in fluid communication with the mixing chamber.

2. A hydroponic nutrient circulation system comprising:

a nutrient reservoir;

a plurality of grow tanks;

a nutrient supply system for supplying nutrient from the nutrient reservoir to the grow tanks, the nutrient supply system including a nutrient supply line extending into each grow tank, the nutrient supply system including a pump and a manifold within the nutrient reservoir, the manifold being connected to the pump;

a nutrient return system for returning nutrient from the grow tanks to the nutrient reservoir, the nutrient return system including a nutrient return line extending into each grow tank; and a plurality of nutrient aeration and flow control (NAFC) devices, each NAFC device associated with one of the nutrient supply lines, each NAFC device connected to the manifold, each NAFC device including:

a nutrient supply intake to which the associated nutrient supply system is connected;

an air intake to which the associated nutrient return line is connected;

a nozzle in fluid communication with the nutrient supply intake;

a mixing chamber in fluid communication with the nozzle and with the air intake;

a receiver port in fluid communication with the mixing chamber and aligned with the nozzle;

a grow tank supply outlet to which the associated nutrient supply line is connected, the grow tank supply outlet in fluid communication with the receiver port; and a bypass chamber surrounding the grow tank supply outlet and in fluid communication with the mixing chamber, the bypass chamber including an outlet into the reservoir tank.

3. The system as defined in claim 1 wherein the NAFC device further includes a plurality of quick-connect couplings for connecting the NAFC device to the nutrient supply system.

4. A hydroponic nutrient circulation system comprising:

a nutrient reservoir;

a plurality of grow tanks;

a nutrient supply system for supplying nutrient from the nutrient reservoir to the grow tanks, the nutrient supply system including a nutrient supply line extending into each grow tank;

a nutrient return system for returning nutrient from the grow tanks to the nutrient reservoir, the nutrient return system including a nutrient return line extending into each grow tank, each nutrient return line including:

an end in the associated grow tank; and a mechanism adapted to adjust the vertical position of the end within the associated grow tank; and a plurality of nutrient aeration and flow control (NAFC) devices, each NAFC device associated with one of the nutrient supply lines, each NAFC device including:

a nutrient supply intake to which the nutrient supply system is connected;

an air intake to which the associated nutrient return line is connected;

a nozzle in fluid communication with the nutrient supply intake;

a mixing chamber in fluid communication with the nozzle and with the air intake;

a receiver port in fluid communication with the mixing chamber and aligned with the nozzle; and a grow tank supply outlet to which the associated nutrient supply line is connected, the grow tank supply outlet in fluid communication with the receiver port.

* * * * *